(12) United States Patent
Kuroiwa

(10) Patent No.: US 8,395,675 B2
(45) Date of Patent: Mar. 12, 2013

(54) CAMERA

(75) Inventor: Toshihisa Kuroiwa, Miura (JP)

(73) Assignee: Nikon Corporation, Tokyo (JP)

( * ) Notice: Subject to any disclaimer, the term of this patent is extended or adjusted under 35 U.S.C. 154(b) by 570 days.

(21) Appl. No.: 12/385,828

(22) Filed: Apr. 21, 2009

(65) Prior Publication Data

US 2009/0278955 A1 Nov. 12, 2009

(30) Foreign Application Priority Data

May 7, 2008 (JP) .................................. 2008-121403

(51) Int. Cl.
*H04N 5/228* (2006.01)
(52) U.S. Cl. ............... 348/222.1; 348/231.2; 348/231.6; 348/333.05; 348/207.99
(58) Field of Classification Search ............... 348/220.1, 348/231.2–231.6, 333.05, 207.99
See application file for complete search history.

(56) References Cited

U.S. PATENT DOCUMENTS

| 7,193,646 | B1 * | 3/2007 | Shioji | 348/220.1 |
| 7,636,898 | B2 * | 12/2009 | Takahashi | 715/769 |
| 2007/0157827 | A1 * | 7/2007 | Mikami | 101/2 |

FOREIGN PATENT DOCUMENTS

| JP | A-11-266420 | 9/1999 |
| JP | A-11-341421 | 12/1999 |
| JP | A-2001-43239 | 2/2001 |
| JP | A-2004-297424 | 10/2004 |
| JP | A-2005-026951 | 1/2005 |
| JP | A-2005-143020 | 6/2005 |
| JP | A-2005-253087 | 9/2005 |

OTHER PUBLICATIONS

Jul. 31, 2012 Japanese Office Action issued in Japanese Patent Application No. 2008-121403 (with English Translation).

* cited by examiner

*Primary Examiner* — Yogesh Aggarwal
(74) *Attorney, Agent, or Firm* — Oliff & Berridge, PLC

(57) ABSTRACT

A camera includes: an information creation device that creates association information for associating a plurality of image files created by the first image file creation device based on a plurality of image data acquired by the image device as a set of image data and recorded in the recording medium, with each other as a set of individual image files when the camera is set to a first photography mode in which data of a plurality of image files are combined to create one integrated image file; a second image file creation device that combines a plurality of the individual image files based on the association information in response to an instruction by a user to create one integrated image file; and a second recording control device that records the integrated image file created by the second image file creation device in a recording medium.

13 Claims, 9 Drawing Sheets

FIG. 7A SCREEN 1
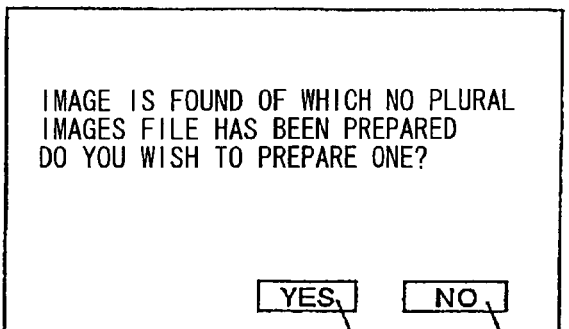
FIG. 7B SCREEN 2
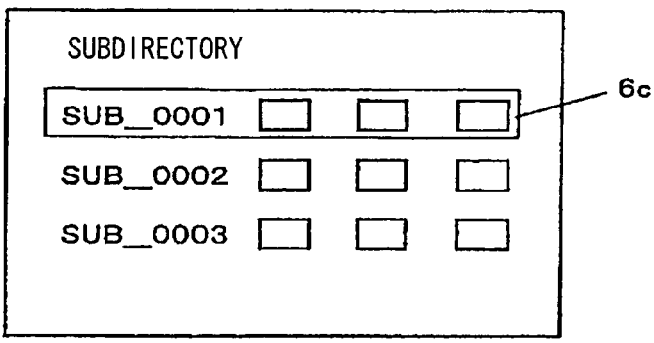
FIG. 7C SCREEN 3
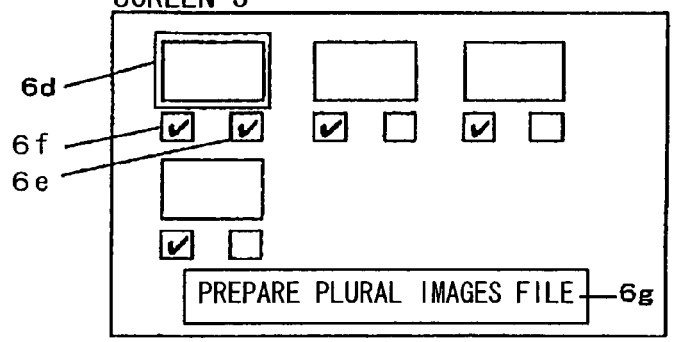
FIG. 7D SCREEN 4
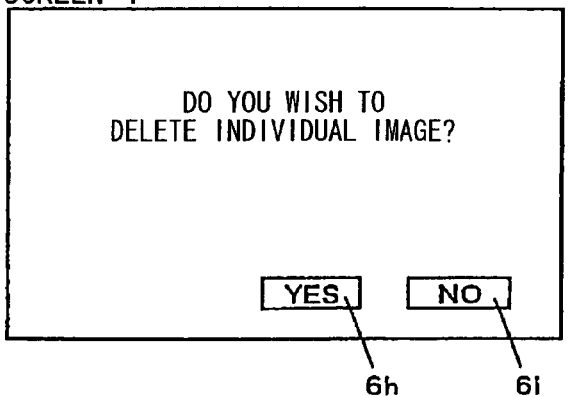

CAMERA

INCORPORATION BY REFERENCE

The disclosure of the following priority application is herein incorporated by reference:

Japanese Patent Application No. 2008-121403 filed May 7, 2008.

BACKGROUND OF THE INVENTION

1. Field of the Invention

The present invention associates to a camera.

2. Description of Related Art

Japanese Laid-Open Patent Publication No. 2001-43239 discloses an image recording apparatus that records a plurality of image data in one image file.

However, when it is contemplated to create an image file containing a plurality of image data by the conventional image recording apparatus, the user has had to set the camera before shooting such that an image file containing a plurality of image data is to be created if there is a possibility to create such a file even though the user cannot make up his mind to do so.

SUMMARY OF THE INVENTION

A camera according to a first aspect of the present invention, comprises: an image device that captures an image of a subject to acquire image data; a first image file creation device that creates an image file based on the image data acquired by the image device; a first recording control device that records the image file created by the image file creation device in a recording medium; an information creation device that creates association information for associating a plurality of image files created by the first image file creation device based on a plurality of image data acquired by the image device as a set of image data and recorded in the recording medium, with each other as a set of individual image files when the camera is set to a first photography mode in which data of a plurality of image files are combined to create one integrated image file; a second image file creation device that combines a plurality of the individual image files based on the association information in response to an instruction by a user to create one integrated image file; and a second recording control device that records the integrated image file created by the second image file creation device in a recording medium.

According to a second aspect of the present invention, in the camera according to the first aspect, the first recording control device may leave the individual image files to be recorded in the recording medium after the integrated image file is created by the second recording control device.

According to a third aspect of the present invention, the camera according to the first aspect may further comprises: an acceptance device that accepts selection by the user of an image file from a plurality of the individual image files, wherein: the information creation device creates association information for associating as one set the individual image files selection of which has been accepted by the acceptance device.

According to a fourth aspect of the present invention, the camera according to the third aspect may further comprises: a deletion device that deletes an individual image file other than the individual image files selection of which has been accepted by the acceptance device.

According to a fifth aspect of the present invention, in the camera according to the third aspect, it is preferable that the first recording control device records the individual image files in an individual image file recording region prepared in the recording medium; the second recording control device records the integrated image file in an integrated image file recording region prepared in the recording medium; and the camera further comprises a recording destination change device that copies or moves the individual image files selection of which has been accepted by the acceptance device from the individual image file recording region to the integrated image file recording region.

According to a sixth aspect of the present invention, in the camera according to the fifth aspect, the second recording control device may assign a file name to the integrated image file so that a region name of the individual image file recording region and a region name of the integrated image file recording region are associated with each other.

According to a seventh aspect of the present invention, in the camera according to the first aspect, it is preferable that file names of the individual image files and a file name of the integrated image file include respective number sections expressed as number symbols; and the first recording control device and the second recording control device assign file names to the individual image files and the integrated image file so that the number sections of the file names of the individual image files and the number section of the file name of the integrated image file constitute consecutive numbers.

According to a eighth aspect of the present invention, in the camera according to the first aspect, it is preferable that when photography modes of the camera include the first photography mode and a second photography mode in which the integrated image file is not created, a file name of the integrated image file recorded in the recording medium in the first photography mode and a file name of the image file recorded in the recording medium in the second photography mode (referred to as a single image file) contain respective number sections expressed as number symbols; and the first recording control device and the second recording control device assign the file names of the integral image file and the single image file so that the number section of the file name of the integral image file and the number section of the file name of the single image file constitute consecutive numbers.

According to a ninth aspect of the present invention, in the camera according to the first aspect, it is preferable that when photography modes of the camera include the first photography mode and a second photography mode in which the integrated image file is not created, the first recording control device assigns respective file names to the individual image files recorded in the recording medium in the first photography mode and the image file (referred to as a single image file) recorded in the recording medium in the second photography mode so that the file names of the individual image file and the single image file do not overlap each other.

According to a tenth aspect of the present invention, in the camera according to the first aspect, the information creation device may associate a plurality of the individual image files with each other by any one of methods (1) to (3) below:

(1) a method in which a plurality of the individual image files to be associated as one set is recorded in one region, (2) a method in which information for associating a plurality of individual images as a set is recorded in a header section of each of the individual image files, and (3) a method in which a plurality of individual image files is associated as a set by use of a database.

BRIEF DESCRIPTION OF THE DRAWINGS

FIGS. 7A to 7D illustrate specific examples of the screen created in the procedure of creating a plural images file;

DETAILED DESCRIPTION OF THE INVENTION

First Embodiment

Figure 1:
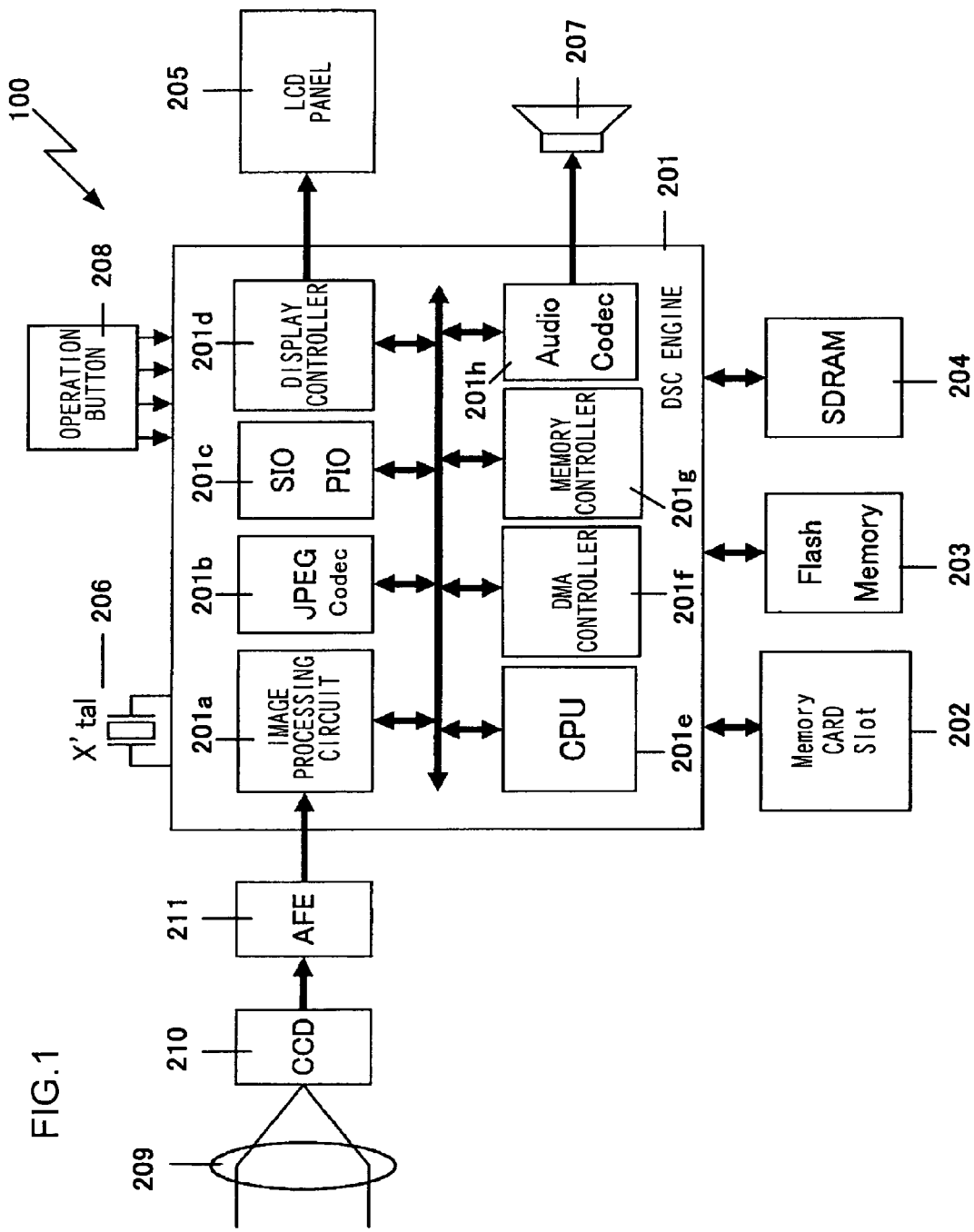
FIG. 1 is a block diagram showing the construction of a camera according to an embodiment of the present invention.

FIG. 1 is a block diagram showing the construction of a camera according to a first embodiment of the present invention. A camera 100 includes a DSC engine 201 that operates the camera 100. In the DSC engine 201, there are provided an image processing circuit 201a, a JPEG Codec 201b, a SIO/PIO 201c, a display controller 201d, a CPU 201e, a DMA controller 201f, a memory controller 201g, and an audio Codec 201h.

The DSC engine 201 is connected to external devices such as a memory CARD slot 202, a flash memory 203, SDRAM 204, an LCD panel 205, a quartz oscillator (X'tal) 206, a speaker 207, and an operation button 208. The DSC engine 201 is also connected to a photographic lens 209, an image sensor (for example, CCD) 210, an AFE 211, and an imaging circuit such as a TG (timing generator), which is not shown.

Explanation is made on the imaging processing in the camera 100. An image of a subject is formed on the CCD 210 through the photographic lens 209. At the time of shooting, a mechanical shutter, a mechanical aperture, a focus lens, a zoom lens and the like are driven to perform shooting. A motor driver IC (not shown) is used to drive these components and the motor driver IC is controlled through an SIO (serial port) 201c or PIO (parallel port) 201c of the DSC engine 201. The CCD 210 is driven by the TG (not shown) to perform exposure of the subject to light and reading out of the image signal. The TG and the AFE 211 to be detailed later is controlled by serial communication that uses the SIO 201c of the DSC engine 201.

The image signal read out from the CCD 210 is sampled by the Analog Front End (AFE) 211 and converted to digital data pixel by pixel. The digital image data (RAW data) is input to the DSC engine 201 and subjected to image processing in the image processing circuit 201a that exists inside the DSC engine 201. For example, the image processing circuit 201a performs WB adjustment, γ correction, color interpolation, color conversion (color correction), resolution conversion, edge reinforcement, and so on and records image data after the image processing into the SDRAM 204.

In the image processing, the image processing circuit 201a creates display image data for displaying a through image (live preview image) and records it in the SDRAM 204. The display controller 201d reads out display image data from the SDRAM 204 and outputs it to the LCD panel 205, thereby displaying a through image on the LCD panel 205.

The JPEG Codec 201b reads out from the SDRAM 204 the image data after the image processing by the image processing circuit 201a and performs JPEG compression to create an image data of a JPEG format. The JPEG Codec 201b records the created JPEG image data in the SDRAM 204. The CPU 201e reads out the JPEG data recorded in the SDRAM 204 to create an image file and records the created image file in a memory card, for example, an SD card inserted in the memory CARD slot 202.

Input and output of data to and from the memory card inserted in the memory CARD slot 202, the flush memory 203, and the SDRAM 204 are controlled by the memory controller 201g.

In the present embodiment, when a photographic mode of the camera 100 is set to a mode in which a plurality of images is taken as a set such as a continuous shooting photography mode or a panorama photography mode, the CPU 201e records image files captured as one set in the photographic mode in the memory card after they are associated with each other. For example, the CPU 201e stores the plurality of image files taken as one set in one directory (folder) prepared in the memory card, thereby associating the image files with each other.

The CPU 201e gathers and records as one file the data in the plurality of the associated image files that are stored as one set in the memory card based on the result of the above-mentioned association after the photography of one set of images is completed, that is, a continuous shooting photography or panorama photography is completed. That is, in the present embodiment, the data in the image files taken as one set as mentioned above and recorded in the memory card are recorded as a whole in an image file of a file format that can record a plurality of image data in one image file.

Figure 2:
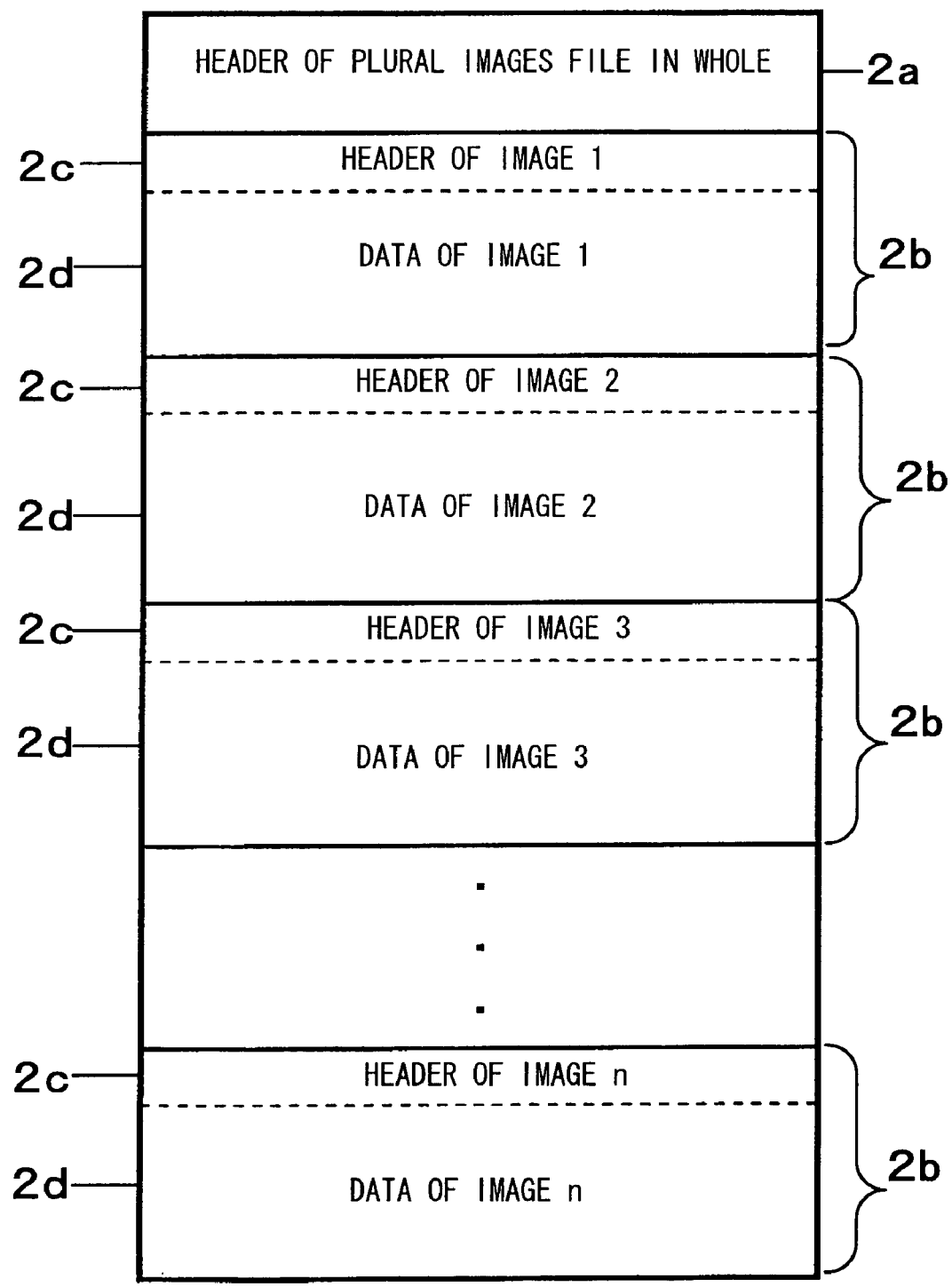
FIG. 2 is a schematic diagram showing the file format of a plural images file.

FIG. 2 is a schematic diagram showing a file format of an image file that can record a plurality of image data according to the present embodiment. The file format is hereinafter referred to as a plural images format. In the present embodiment, an image file of the plural images format is referred to as a plural images file. The plural images file is assigned ".MIG" as an extension.

The plural images file includes one header section 2a that stores header information on the plural images file in whole and a plurality of individual image data sections 2b that stores data recorded in separate image files (individual image files). Individual image data sections 2b include each a header section 2c for storing the header information of the individual image recorded in the individual image file and an image data section 2d for storing image data of the individual image.

For example, when the CPU 201e records n individual image files as one set in a directory created in a memory card by continuous shooting photography, the CPU 201e reads out data in each individual image file from the directory and stores the data in each individual image data section 2b, thereby creating a plural images file of the format as shown in FIG. 2.

Figure 3:
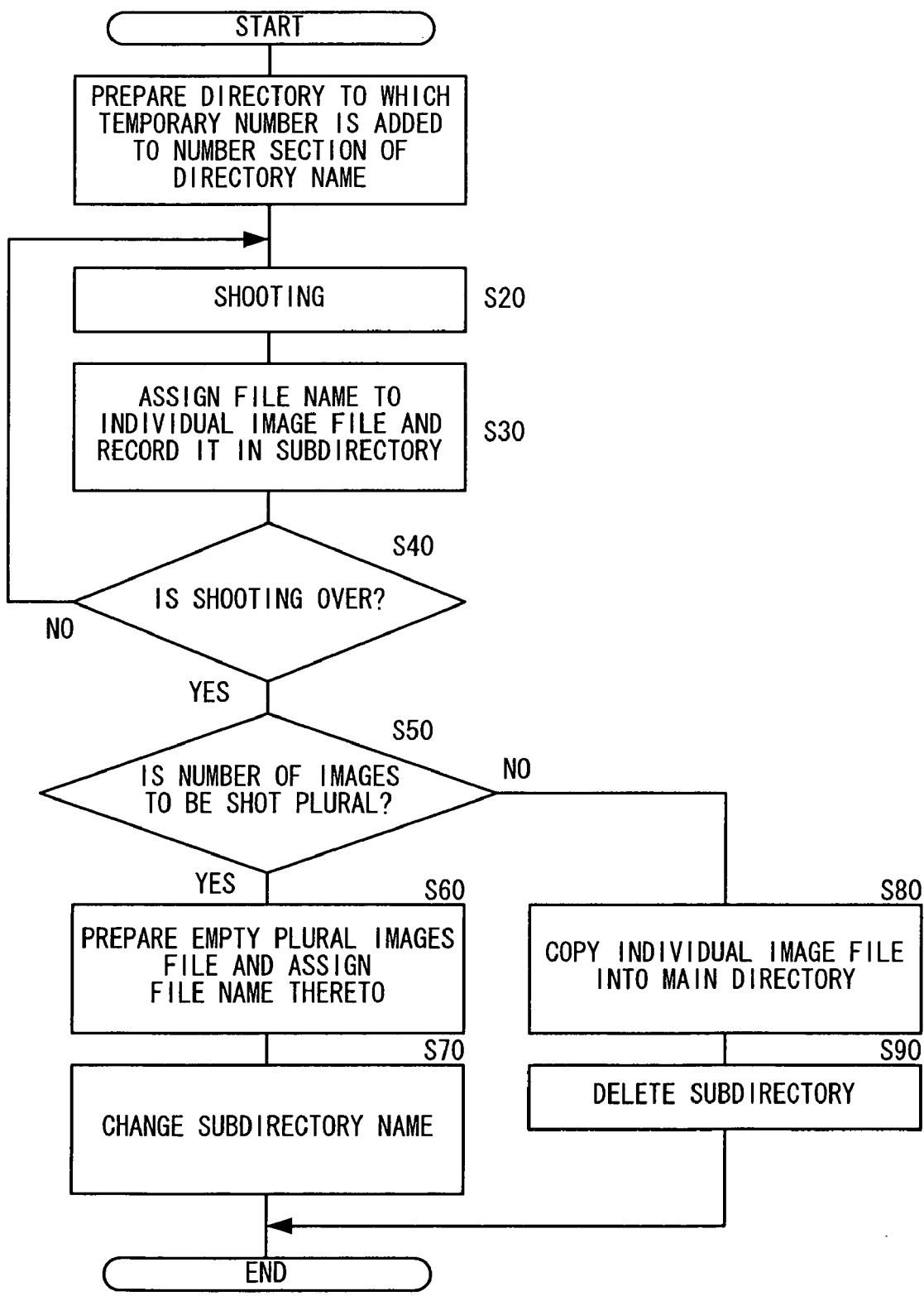
FIG. 3 is a flowchart showing processing by the camera according to a first embodiment.

FIG. 3 is a flowchart illustrating the processing by the camera 100 according to the first embodiment. The processing shown in FIG. 3 is performed by executing a program that is started up when a release button contained in an operation button 208 is fully pressed by the user while the camera 100 is set in the photography mode in which a plurality of images is taken as one set, such as a continuous shooting mode or a panorama photography mode.

In step S10, the CPU 201e prepares a subdirectory for recording individual image files taken as one set in a memory card inserted in the memory CARD slot 202. In the present embodiment, the CPU 201e causes a number section to be included in each of the subdirectory name, the file name of individual image file, and the file name of a plural images file. The CPU 201e controls such that the number section of the file name of the individual image file and the number section of the file name of the plural images file constitute consecutive numbers so that the respective file names of the individual image file and of the plural images file will not overlap each other except for the extensions of the file names.

The CPU 201e makes the number section of the file name of the plural images file identical to the number section of the name of the subdirectory to associate a plural images file with the subdirectory having recorded therein the individual image files from which the plural images file has been created. The association makes it possible to figure out which individual image files in the subdirectory have been used to create the plural images file.

Figure 4A:
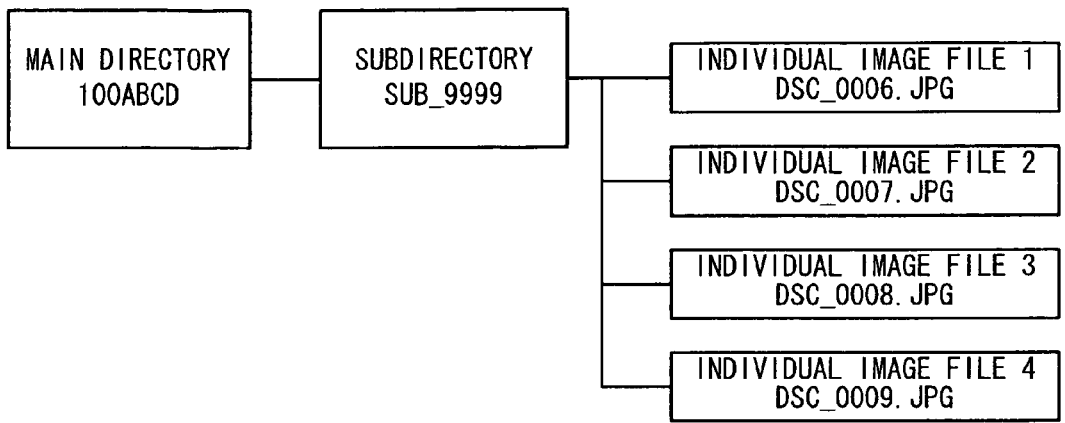
FIGS. 4A to 4C are diagrams showing specific examples of directory structures according to the first embodiment.

The CPU 201e assigns a temporary number to the number section of the directory name of the prepared subdirectory in step S10. For example, as shown in FIG. 4A, a subdirectory is prepared in the main directory (100ABCD) in the memory CARD slot 202 and the directory name thereof is defined as "SUB_9999" that includes the temporary number 9999.

Thereafter, the procedure proceeds to step S20 in which the CPU 201e performs shooting corresponding to the photographic mode based on the operation of the release button by the user to create the above-mentioned individual image file. Then, the procedure proceeds to step S30. In step S30, the CPU 201e assigns a file name in conformity with the file nomenclature to the individual image file created in step S20 and records the file in the subdirectory prepared in step S10. For example, the CPU 201e assigns to the created individual image file an image file name containing a number obtained by adding 1 to the last number, that is, the greatest number contained in the file names of existing image files.

The existing image files referred to herein mean image files other than the individual image files created in step S20, such as those image files recorded in the main directory (100ABCD), other individual image files recorded in the subdirectory (SUB_9999), and individual image files recorded in other subdirectories and so on.

For example, the last number included in the file names of the existing image files is 5 (0005) when an individual image file 1 is created, the CPU 201e assigns, to the individual image file 1, "DSC_0000.JPG" as a file name that includes 6 obtained by adding 1 to the last number, and records it in the subdirectory (SUB_9999).

Similarly, when individual image files 2, 3, and 4 are recorded as a set of image files, the CPU 201e assigns a file name "DSC_0007.JPG" to the individual image file 2, a file name "DSC_0008.JPG" to the individual image file 3 and a file name "DSC_0009.JPG" to the individual image file 4 as shown in FIG. 4A. The CPU 201e then records the individual image files in the subdirectory (SUB_9999). In the present embodiment, a plurality of individual image files shot as one set can be associated with each other by recording the individual image files shot as one set in one subdirectory.

Then, the procedure proceeds to step S40, in which the CPU 201e judges whether shooting of one set of images is completed. If the result of the judgment in step S40 is NO, the procedure returns to step S20. On the contrary, if the result of the judgment in step S40 is YES, the procedure proceeds to step S50. In step S50, the CPU 201e judges whether the number of images shot in the above-mentioned photographic processing is plural. If the result of the judgment in step S50 is YES, the procedure proceeds to step S60.

Figure 4B:
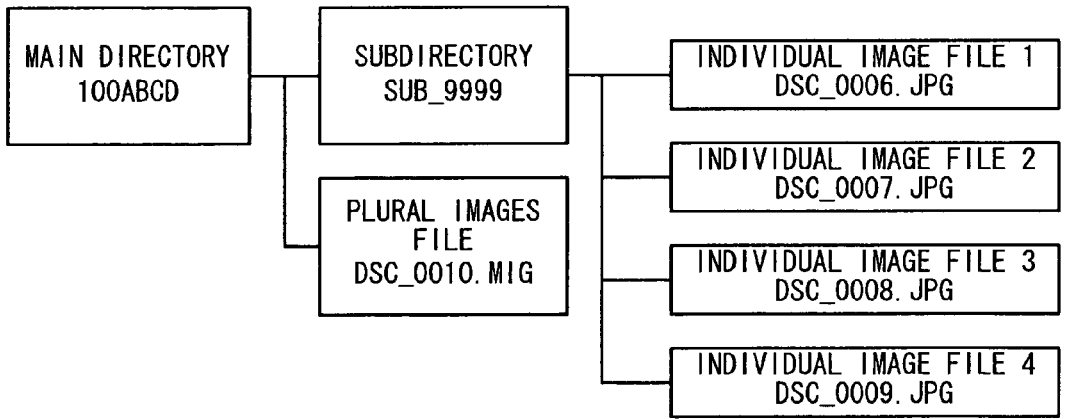
Figure 4C:
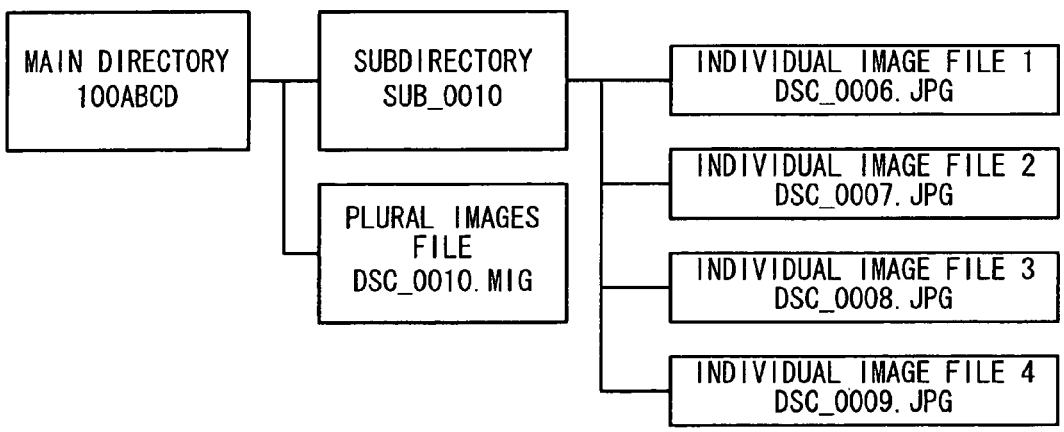

In step S60, the CPU 201e creates an empty plural images file, that is, a plural images file that stores no data in each individual image data section 2b, assigns a file name in conformity with the file nomenclature, and records the file in the main directory (100ABCD). For example, as shown in FIG. 4B, the CPU 201e assigns to the created plural images file an image file name "DSC_0010.MIG" that contains 10 obtained by adding 1 to the last number 9 (0009) contained in the file names of the individual image files recorded in the subdirectory (SUB_9999).

In the present embodiment, no data is stored in each individual image data section 2b in the plural images file in the step of shooting but the data are stored in the individual image data sections 2b by the processing to be detailed later referring to FIGS. 5 and 6. This is done taking into consideration the situations below. That is, on one hand, it is unclear whether the user desires to prepare a plural images file based on the individual image files shot as one set. On the other hand, even when the user desires to prepare a plural images file, it is still unclear whether the user desires to put together all the individual image files shot as one set into one plural images file. For this reason, in the step of shooting, the individual image files are not put together into one plural images file but individual image files shot as one set are recorded in the same subdirectory and only associated with each other so as to enable the user to prepare a plural images file as desired afterwards.

However, when it is arranged not to create a plural images file in the step of shooting, it is impossible to determine the file name of the plural images file. For this reason, the number section of the file name of the individual image file and the number section of the file name of the plural images file cannot be made to constitute sequential numbers or it is impossible to associate the file name of the plural images file with the directory name of the subdirectory. In the present embodiment, in order to avoid such inconveniences, an empty plural images file is created and the above-mentioned image file name is assigned to the created plural images file to determine the file name of the plural images file in the step of shooting.

Thereafter, the procedure proceeds to step S70 and the CPU 201e changes the number section of the directory name of the subdirectory to become identical with the number section of the file name of the plural images file created in step S60 to associate the directory name with the file name. For example, the CPU 201e changes the number section of the directory name of the subdirectory to 10(0010), which is the same as the number section of the file name of the plural images file, to name the subdirectory "SUB_0010". Thereafter, the procedure is terminated.

On the other hand, when the result of the judgment in step S50 is NO, the procedure proceeds to step S80. In step S80, the CPU 201e judges that a plurality of images is not shot as one set and copies or moves the individual image file recorded in the subdirectory to the main directory (100ABCD) so as to record the image therein in the same manner as in the case where ordinary shooting is performed. Then, the procedure proceeds to step S90 and the CPU 201e deletes the subdirectory from the main directory (100ABCD) since no subdirectory is necessary in this case, and the procedure is terminated.

Figure 5:
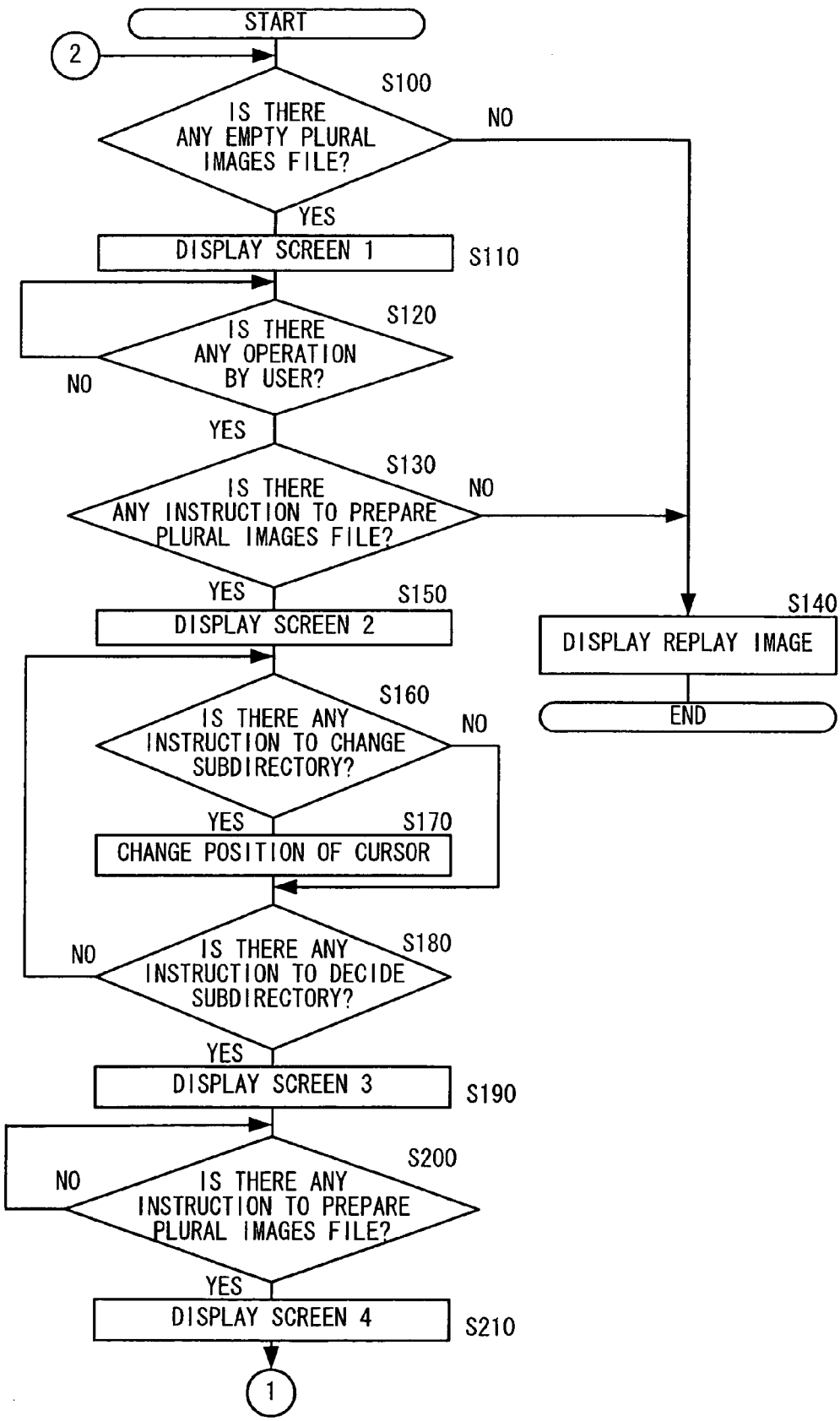
FIG. 5 is a flowchart that illustrates the flow of procedure of creating a plural images file.
Figure 6:
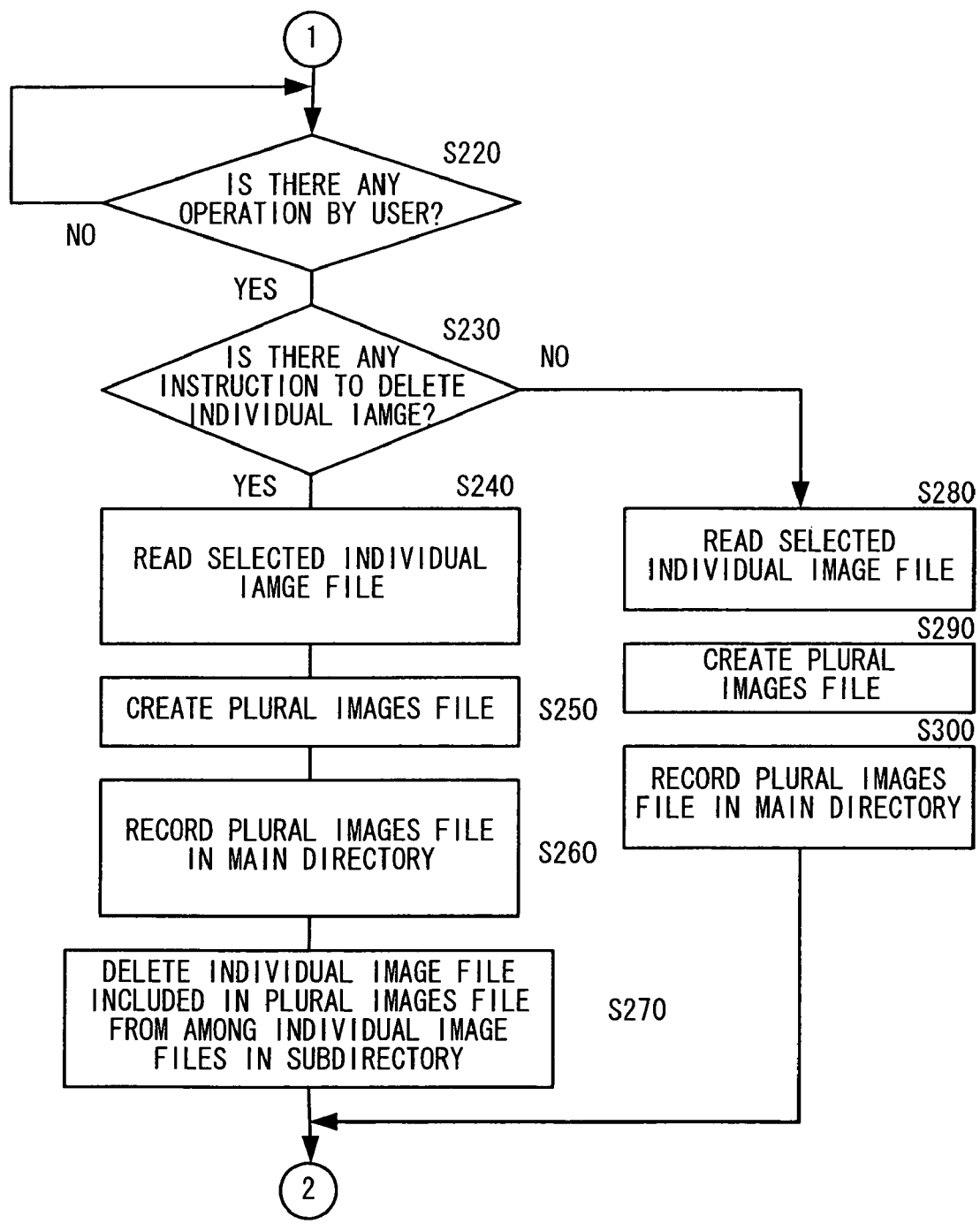
FIG. 6 is a flowchart that illustrates the flow of procedure of creating a plural images file subsequent to the processing in FIG. 5.

FIGS. 5 and 6 are flowcharts each illustrating the flow of processing of creating a plural images file according to the present embodiment. The processing shown in FIGS. 5 and 6 is performed by the CPU 201e according to a program that is started up when the mode of the camera 100 is set to a replay mode for replaying images.

In step S100, the CPU 201e judges whether there is an empty plural images file in the main directory (100ABCD) of the memory card. That is, the CPU 201e judges whether there is a plural images file that is not completely prepared. If the result of the judgment in step S100 is NO, the procedure proceeds to step S140 and the CPU 201 controls the display controller 201d to display the replayed image (reproduced image) on the LCD panel 205 and the procedure is terminated.

On the contrary, if the result of the judgment in step S100 is YES, the procedure proceeds to step S110, in which the CPU 201e displays a screen 1 shown in FIG. 7A on the LCD panel 205 to notify the user that there is a plural images file that is not completely prepared. On the screen 1, a "YES" button 6a and a "NO" button 6b are arranged. The user operates the operation button 208 to select the "YES" button 6a, so that start of preparing the plural images file can be instructed. On the other hand, the user can select the "NO" button 6b to instruct not to start preparing the plural images file.

Thereafter, the procedure proceeds to step S120, in which the CPU 201e judges whether there is an operation of the operation button 208 by the user. If the result of the judgment in step S120 is YES, the procedure proceeds to step S130, in which the CPU 201e judges whether preparation of a plural images file has been instructed based on the operation of the "YES" button on the screen 1 by the user. If the result of the judgment in step S130 is NO, that is, if it has been judged that the "NO" button was operated by the user, the procedure proceeds to the step S140. On the contrary, if the result of the judgment is YES, the procedure proceeds to step S150.

In step S150, the CPU 201e displays a screen 2 shown in FIG. 7B on the LCD panel 205. The CPU 201e displays the directory name of a subdirectory, of which preparation of the plural images file has not been completed, on the screen 2 and displays reduced-size images, for example, thumbnails of the individual image files recorded in the subdirectory in association with each subdirectory name. To be concrete, the CPU 201e specifies an empty plural images file from among the plural images files recorded in the main directory and identifies a subdirectory with the directory name that contains the number section that corresponds to the number section of the file name of the specified plural images file.

The CPU 201e displays the directory name of the specified subdirectory and the thumbnail images of the individual image files recorded in the subdirectory in association with each other on the screen 2. In the example shown in FIG. 7B, there are displayed three subdirectory names, i.e., SUB_0001, SUB_0002, and SUB_0003 and the thumbnail images of the individual image files recorded in each subdirectory in association with each other.

The CPU 201e displays on the screen 2 a cursor 6c for selecting as a set one subdirectory name displayed on the screen 2 and thumbnail images of the individual image files recorded in the subdirectory. The user can operate the operation button 208 to change the subdirectory to be selected. When change of subdirectory is instructed by the user, the CPU 201e moves the cursor 6c on the screen according to the content of the operation. The user can determine an individual image file in the subdirectory at which the cursor 6c is pointed as a target of creation of a plural images file by operating the operation button 208 in a state where the cursor 6c points any one of the subdirectories.

That is, in step S160, the CPU 201e judges whether a change of subdirectory to be selected has been instructed by the operation of the operation button 208 by the user. If the result of the judgment in step S160 is NO, the procedure proceeds to step S180 to be detailed later. On the contrary, if the result of the judgment in step S160 is YES, the procedure proceeds to step S170. In step S170, the cursor 6c is moved on the screen in response to the operation of the operation button 208 by the user and the procedure proceeds to step S180.

In step S180, the CPU 201e judges whether selection of subdirectory has been determined by the operation of the operation button 208 by the user. If the result of the judgment in step S180 is NO, the procedure returns to step S160 and the processing is repeated. On the contrary, if the result of the judgment in step S180 is YES, the procedure proceeds to step S190. In step S190, the CPU 201e displays a screen 3 as shown in FIG. 7C on the LCD panel 205.

The CPU 201e displays on the screen 3 a list of the thumbnails of the individual image files recorded in the subdirectory selected by the user. In addition, the CPU 201 displays a check box 6e for selecting a representative image and a check box 6f for selecting a plurality of images in association with each thumbnail image. The user can select image files whose data he or she wishes to store in the plural images file from among the individual image files by checking the check box 6f for selecting a plurality of images by operating the operation button 208.

For example, it may be constructed such that the CPU 201e checks by default the check boxes 6f for selecting a plurality of images corresponding to all the thumbnail images and the user removes the check from the check box 6f that corresponds to an individual image file the data of which the user does not wish to store in the plural images file.

The user can specify a representative image out of individual image files selected as objects to be included in the plural images file, i.e., individual image files for which the user checked in the check box 6f for selecting plural images by operating the operation button 208 to check the check box 6. One such representative image is specified. Only one of the check boxes 6e for selecting the representative image corresponding to any one of thumbnail image may be checked. When the check in the check box 6f for selecting a plural images file has been removed by the user as mentioned above, and if the check box 6e for selecting plural images corresponding to the thumbnail image has been checked, the CPU 201e removes the check from the check box 6e for selecting a representative image.

The CPU 201e displays a cursor 6d for selecting a thumbnail image. The user can operate the operation button 208 to move the cursor 6d and cause a predetermined operation to be performed in a state in which the cursor 6d points any one of the thumbnail images. In this manner, the check box 6e for selecting a representative image that corresponds to the thumbnail image specified with the cursor 6d and the check box 6f for selecting a plural images file can be checked.

After selecting a representative image and individual image files to be contained in the plural images file on the screen 3, the user can operate the operation button 208 to select a "PREPARE PLURAL IMAGES FILE" button 6g and thus instruct preparing a plural images file that contains the selected individual image files. That is, in step S200, the CPU 201e judges whether preparation of a plural images file has been instructed based on the condition whether the "PREPARE PLURAL IMAGES FILE" button 6g has been selected. If the result of the judgment in step S200 is YES, the procedure proceeds to step S210.

In step S210, the CPU 201e displays a screen 4 shown in FIG. 7D on the LCD panel 205 and to make an inquiry to the user if he or she wishes to delete the individual image files that have been selected to be contained in the plural images files. The user can give an instruction to delete the individual image files that have been selected to be included in the plural images file by operating the operation button 208 to select a "YES" button 6h on the screen 4. On the contrary, the user can give an instruction to retain in the subdirectory the individual image files that have been selected to be contained in the plural images file by operating the operation button 208 to select a "NO" button 6i.

In step S220 in FIG. 6, the CPU 201e judges whether the user has operated the operation button 208. If the result of the judgment in step S220 is YES, the procedure proceeds to step S230 in which the CPU 201e judges whether the content of the operation has been the selection of the "YES" button 6h, that is, an instruction for the deletion of the individual image files. If the result of the judgment in step S230 is YES, the procedure proceeds to step S240.

In step S240, the CPU 201e reads out the individual image files corresponding to the thumbnail images of which the check boxes 6f for selecting plural images have been checked on the screen 3 from the memory card to the SDRAM 204 and also reads out the plural images file prepared in step S60, and the procedure proceeds to step S250. In step S250, the CPU 201e puts together (combines) the data of the individual image files read out to the SDRAM 204 into one to create a plural images file of the format shown in FIG. 2. To be concrete, the CPU 201e creates a plural images file in which the data of the individual image files read out to the SDRAM 204 are stored in respective individual image data sections 2b.

Subsequently, the procedure proceeds to step S260, in which the CPU 201e labels the plural images file created in step S240 as the same file name as that of a corresponding empty plural images file recorded in the main directory and overwrite save it in the main directory. As a result, a plural images file containing a plurality of data of individual image files in the subdirectory can be created with keeping the association between the subdirectory and the corresponding plural images file using the directory name and the file name.

The CPU 201e maybe adapted to copy the individual image file, which has been selected by the user as a representative image on the screen 3 shown in FIG. 7C when a plural images file is created, from the subdirectory to the main directory and record it in the main directory.

Then, the procedure proceeds to step S270, in which the CPU 201e deletes the image files whose data are contained in the plural images file from the subdirectory where the plural images file has been created and the procedure returns to step S100. As a result, the individual image files whose data have not been contained in the plural images file are allowed to remain as they are in the subdirectory so that the user can browse the respective image data in the individual image files.

On the contrary, when the judgment in step S230 is NO, the procedure proceeds to step S280. In steps S280 to step S300, the CPU 201e performs processing similar to that in step S240 to step S260. Then, the procedure returns to step S100.

In the above-mentioned first embodiment, the following advantageous effects can be obtained.

(1) When the photographic mode of the camera 100 is set to a mode for creating an integrated image file by combining the data of a plurality of image files, for example, a continuous shooting photography mode or a panorama photography mode, a plurality of the acquired image files can be associated with each other by recording each of them in the same subdirectory. The CPU 201e combines the data of the plurality of individual image files in the subdirectory to create a single plural images file in response to the instruction by the user and records the created plural images file in the memory card. This enables the user to create a plural images file after completion of the shooting even when the camera has not been set to create a plural images file before the shooting.

(2) When the deletion of individual image files has not been instructed by the user on the screen 4 shown in FIG. 7D, the CPU 201e leaves the individual image files as registered in the subdirectory after the plural image file has been created. This enables the user to use the original individual image from which the plural image file has been created even after the plural images file has been created.

(3) The CPU 201e is adapted to display each of the screens shown in FIGS. 7A to 7D for inviting the user to select image files among the plurality of individual image files recorded in the subdirectory and create a plural images file based on the individual image files selected by the user. This enables the user to select individual image files to be contained in the plural images file as desired.

(4) The CPU 201e is adapted to assign a file name to the plural images file in such a manner that the directory name of the subdirectory and the file name of the plural images file are associated with each other. This enables the user to grasp which subdirectory the individual image files used for creating the plural images file have been recorded in.

(5) The file names of individual image files and the file name of the plural images file include respective number sections expressed by number symbols. The CPU 201e is adapted to assign the file names to the individual image files and the plural images file such that the number sections of the file names of the individual image files and the number section of the file name of the plural images file constitute consecutive numbers. As a result, overlapping between the file names of the individual image files and the file name of the plural images file can be prevented.

Second Embodiment

In the above-mentioned first embodiment, the plural image file is associated with the subdirectory in which the individual image files used for creating the plural images file are recorded by making the number section of the file name of the plural images file and the file name of the subdirectory identical with each other. For this purpose, the number section in the directory name of the subdirectory is assigned with a temporary number in advance and when preparation of an empty plural images file is completed, the number section in the file name of the plural images file and the number section in the directory name of the subdirectory are made identical.

In the second embodiment, however, association between the file name of the plural images file and the directory name of the subdirectory is not performed but instead other information is used to associate the plural images file with the subdirectory in which the individual image files used for creating the plural images file are recorded. In the second embodiment, FIGS. 1, 2, and 5 to 7D are the same as in the first embodiment, so that detailed explanations thereof are omitted herein.

Figure 8:
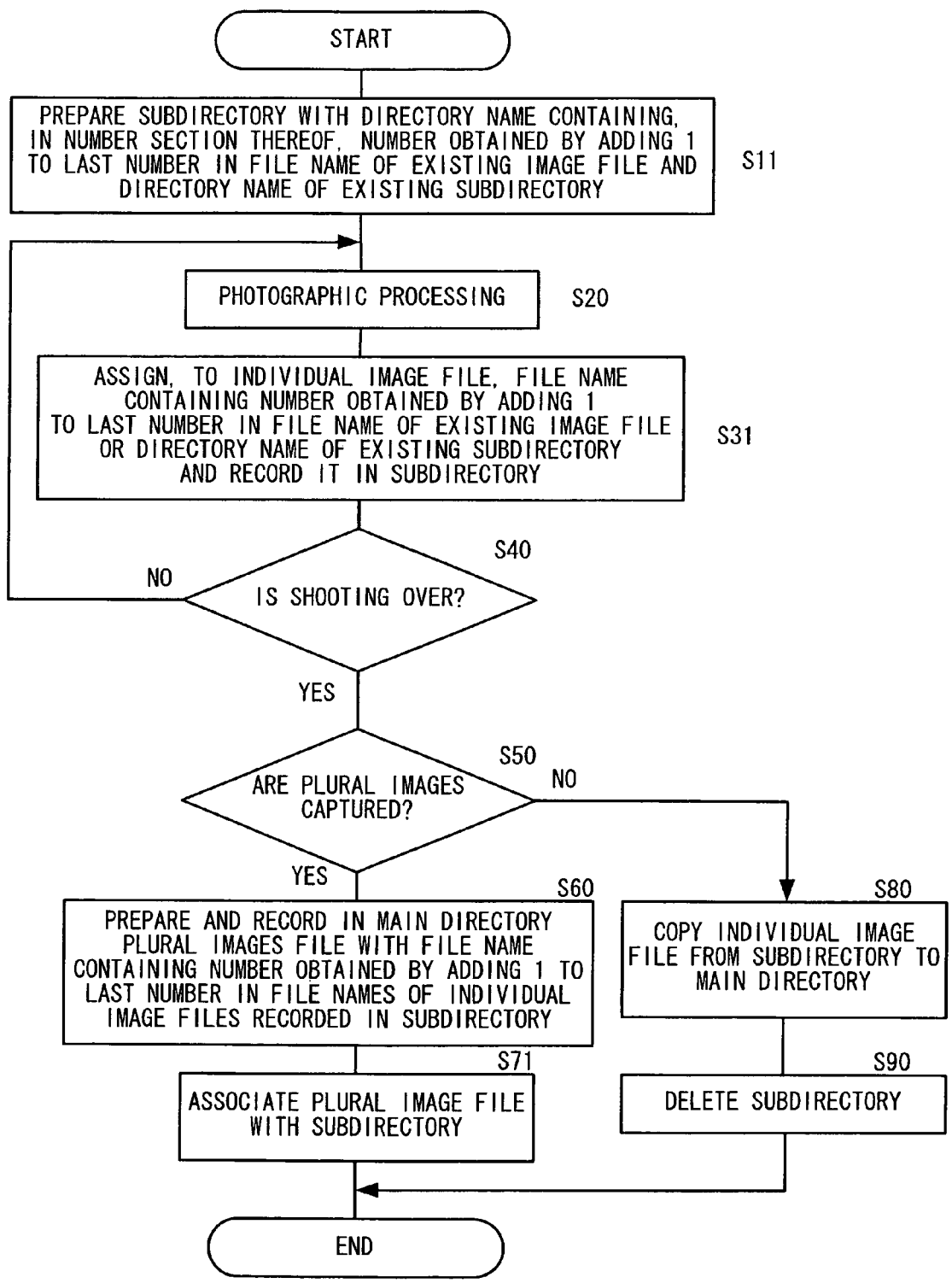
FIG. 8 is a flowchart illustrating the processing by the camera according to a second embodiment of the present invention.

FIG. 8 is a flowchart illustrating the processing by the camera 100 according to the second embodiment. The processing illustrated in FIG. 8 is performed according to a program that is started up by fully pressing the release button included in the operation button 208 by the user when the photographic mode of the camera 100 is set to a mode in which a plurality of images is shot as a set, such as a continuous photography mode or a panoramic photography mode. In FIG. 8, processing similar to that in FIG. 3 is assigned the same step number and explanation is focused to differences from FIG. 3.

In step S11, the CPU 201e prepares a subdirectory for recording therein individual image files taken as one set in the memory card inserted in the memory CARD slot 202. In the present embodiment, the CPU 201e provides number sections in the subdirectory name, file names of individual image files, and the file name of the plural images file, respectively. The CPU 201e assigns consecutive numbers to the number section of the subdirectory name, the number section of the file names of the individual image files, and the number section of the file name of the plural images file in order to avoid overlaps in the number sections.

For this purpose, in step S11, the CPU 201*e* assigns to the created subdirectory a directory name obtained by adding 1 to the last number in the file names of the existing image files and the directory names of the existing subdirectories. By the existing image files is meant image files recorded in the main directory (100ABCD) and the individual image files recorded in the subdirectory (SUB_9999).

Figure 9A:
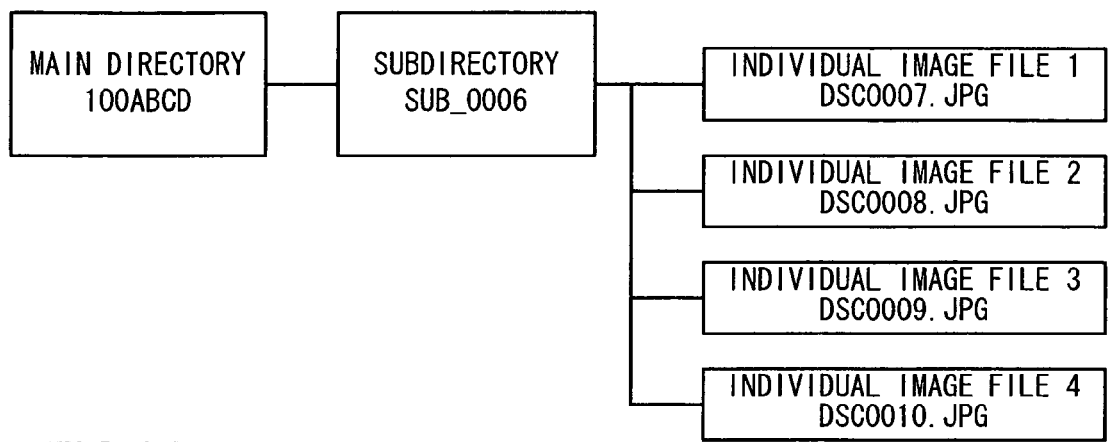
FIGS. 9A and 9B illustrate specific examples of the directory structure according to the second embodiment.

For example, if the last number contained in the existing directory name and the file names is 5 (0005), the CPU 201*e* assigns to the subdirectory a file name of "SUB_0006" as shown in FIG. 9A as a file name that contains a number 6 obtained by adding 1 to the last number of 5.

Then, the procedure proceeds to step S20, in which the CPU 201*e* performs shooting processing in the same manner as in the first embodiment and the procedure proceeds to step S31. In step S31, the CPU 201*e* assigns a filename in conformity with the above-mentioned nomenclature to the individual image files created in the step S20 and records them in the subdirectory prepared in step S11.

To be concrete, the CPU 201*e* assigns to the created individual image file an image file name that contains a number obtained by adding 1 to the last number, i.e., the greatest number included in the file names of the existing image files and directory names of the existing subdirectories. For example, if the last number included in the existing directory names and the existing file names is 6 (0006) which is included in the subdirectory name assigned in step S11 when an individual image file 1 is created, the CPU 201*e* assigns to the individual image file 1 a file name of "DSC_0007.JPG" as a file name that includes 7 obtained by adding 1 to the last number and records it in the subdirectory (SUB_0006).

Similarly, when individual image files 2, 3, and 4 are recorded as a set of image files, the CPU 201*e* assigns a file name of "DSC_0008.JPG" to the individual image file 2, a file name of "DSC_0009.JPG" to the individual image file 3, and a file name of "DSC_0010.JPG" to the individual image file 4 as shown in FIG. 9A. The CPU 201*e* records each individual image file in the subdirectory (SUB_0006). Also, in the present embodiment, a plurality of individual image files shot as one set can be associated with each other by recording the individual image files shot as one set in one and the same subdirectory.

Figure 9B:
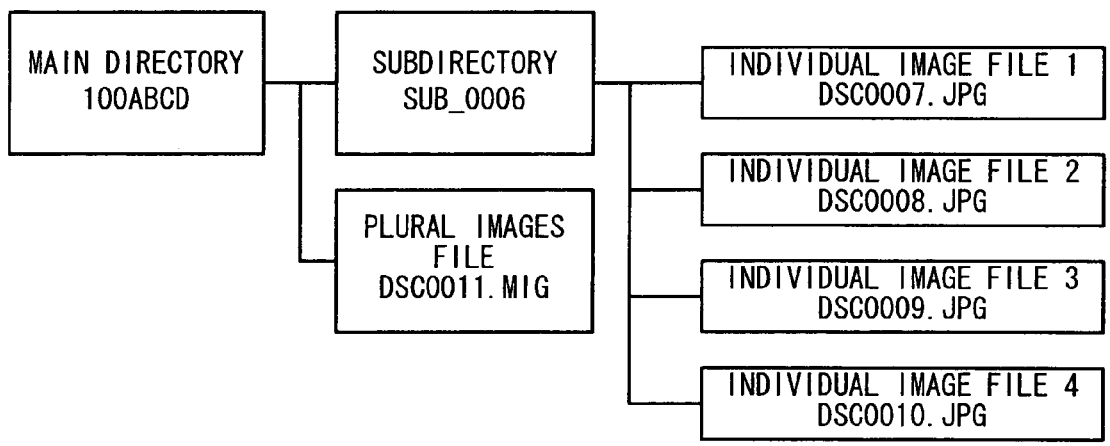

The CPU 201*e* performs the processing in steps S40 to S60 in the same manner as in the first embodiment. In this case, as shown in FIG. 9B, a plural images file is assigned with an image file name "DSC_0011.MIG" that contains 11 obtained by adding 1 to the last number 10 (0010) contained in the file names of the individual image files recorded in the subdirectory (SUB_0006). Then, the procedure proceeds from step S60 to step S71, in which the CPU 201*e* associate the plural images file with the subdirectory that has recorded therein individual image files from which the plural images file has been created. In the present embodiment, the CPU 201*e* may perform the above-mentioned association by associating the file name of the plural images file with the directory name of the subdirectory by use of a database. The CPU 201*e* may perform the above-mentioned association by recording the directory name of the subdirectory in which the individual image files from which the plural images file has been created in a header section 2*a* of the plural images file.

According to the second embodiment as explained above, the following advantageous effects as well as those in the first embodiment can be obtained. That is, the CPU 201*e* is adapted to associate the plural images file with the subdirectory that has recorded therein individual image files from which the plural images file has been created by use of a database or by recording the directory name of the subdirectory in which the individual image files from which the plural images file has been created in a header section 2*a* of the plural images file. As a result, it becomes possible to grasp which subdirectory the individual image files used to create the plural images file are recorded.

Modifications

The camera according to the above-mentioned embodiments can be modified as follows.

(1) In the first embodiment mentioned above, the processing for creating a plural images file shown in FIGS. 5 and 6 has been explained on the example that is performed by the CPU 201*e* when the camera 100 has been set to a replay mode. However, the CPU 201*e* may perform the processing shown in FIG. 5 when the power of the camera 100 is turned ON. In this case, a through image (live preview image) maybe displayed instead of a replay image in step S140.

(2) In the first and second embodiments mentioned above, explanation has been made on the examples in which the CPU 201*e* processes a plurality of images shot by continuous photography or panorama photography as a set of images. However, the present invention is not limited to continuous shooting photography and panorama photography but is also applicable to other cases in which a plurality of images is treated as a set of images. For example, the present invention is applicable to the case in which a plurality of images is shot by multi-view photography.

(3) In the above-mentioned embodiments, explanation has been made on the example in which the CPU 201*e* deletes the individual image files contained in the plural images file from the subdirectory when it is instructed by the user to delete the individual image files. However, the CPU 201*e* may be constructed such that after the plural images file has been prepared, the individual image files contained in the plural images file are left in the subdirectory and the individual image files that have not been included in the plural images file are deleted from the subdirectory. This enables automatic deletion of individual image files taking into consideration the fact that it is highly possible that the individual image files that have been judged by the user not to be included in the plural images file will be unnecessary.

(4) In the above-mentioned embodiments, explanation has been made on the example in which the CPU 201*e* records the individual image files in the subdirectory and the plural images file in the main directory. However, when a plural images file is prepared, the individual image files that have been contained in the plural images file may be copied or moved from the subdirectory to the main directory.

(5) In the above-mentioned embodiments, explanation has been made on the example in which individual image files are recorded in the subdirectory when the shooting mode of the camera is set to the continuous photography mode or the panorama photography mode. However, the camera 100 may perform shooting in an ordinary photography mode. In this case, the image file shot in the ordinary photography mode (single image file) is recorded in the main directory in the memory card. Accordingly, it is necessary for the CPU 201*e* to avoid overlaps between the file name of the single image file and the file name of each individual image file. For example, the CPU 201*e* assigns consecutive numbers to the number section of the single image file and the number section of the file name of each individual image file so that the file names of both the image files do not overlap with each other.

(6) The CPU 201*e* may assign consecutive numbers to the number section of the file name of the single image file and the number section of the file name of the plural images file to avoid overlap between the file names (sections other than the extensions) of both the image files.

As explained above, according to the present embodiments, the user can create a combined image file by readily specifying image files to be combined after completion of shooting without preliminarily setting the camera so as to enable creation of a combined image file before shooting.

The above-described embodiments are examples, and various modifications can be made without departing from the scope of the invention.

What is claimed is:

1. A camera, comprising:
an image device that captures an image of a subject to acquire image data;
a first image file creation device that creates an image file based on the image data acquired by the image device;
a first recording control device that records the image file created by the image file creation device in a recording medium;
an information creation device that creates association information for associating a plurality of image files created by the first image file creation device based on a plurality of image data acquired by the image device as a set of image data and recorded in the recording medium, with each other as a set of individual image files when the camera is set to a first photography mode in which data of a plurality of image files are combined to create one integrated image file;
a second image file creation device that combines a plurality of the individual image files recorded to the recording medium based on the association information in response to an instruction by a user to create one integrated image file;
a second recording control device that records the integrated image file created by the second image file creation device in a recording medium; and
an acceptance device that accepts selection by the user of an image file from a plurality of the individual image files,
wherein:
the information creation device creates association information for associating as one set the individual image files selection of which has been accepted by the acceptance device;
the first recording control device records the individual image files in an individual image file recording region prepared in the recording medium;
the second recording control device records the integrated image file in an integrated image file recording region prepared in the recording medium; and
the camera further comprises a recording destination change device that copies or moves the individual image files selection of which has been accepted by the acceptance device from the individual image file recording region to the integrated image file recording region.

2. A camera according to claim 1, wherein:
the first recording control device leaves the individual image files to be recorded in the recording medium after the integrated image file is created by the second recording control device.

3. A camera according to claim 1, further comprising:
a deletion device that deletes an individual image file other than the individual image files selection of which has been accepted by the acceptance device.

4. A camera according to claim 1, wherein:
the second recording control device assigns a file name to the integrated image file so that a region name of the individual image file recording region and a region name of the integrated image file recording region are associated with each other.

5. A camera according to claim 1, wherein:
the information creation device associates a plurality of the individual image files with each other by any one of methods (1) to (3) below:
(1) a method in which a plurality of the individual image files to be associated as one set is recorded in one region,
(2) a method in which information for associating a plurality of individual images as a set is recorded in a header section of each of the individual image files, and
(3) a method in which a plurality of individual image files is associated as a set by use of a database.

6. A camera, comprising:
an image device that captures an image of a subject to acquire image data;
a first image file creation device that creates an image file based on the image data acquired by the image device;
a first recording control device that records the image file created by the image file creation device in a recording medium;
an information creation device that creates association information for associating a plurality of image files created by the first image file creation device based on a plurality of image data acquired b the image device as a set of image data and recorded in the recording medium, with each other as a set of individual image files when the camera is set to a first photography mode in which data of a plurality of image files are combined to create one integrated image file;
a second image file creation device that combines a plurality of the individual image files recorded to the recording medium based on the association information in response to an instruction by a user to create one integrated image file; and
a second recording control device that records the integrated image file created by the second image file creation device in a recording medium;
wherein:
file names of the individual image files and a file name of the integrated image file include respective number sections expressed as number symbols; and
the first recording control device and the second recording control device assign file names to the individual image files and the integrated image file so that the number sections of the file names of the individual image files and the number section of the file name of the integrated image file constitute consecutive numbers.

7. A camera, comprising:
an image device that captures an image of a subject to acquire image data;
a first image file creation device that creates an image file based on the image data acquired by the image device;
a first recording control device that records the image file created by the image file creation device in a recording medium;
an information creation device that creates association information for associating a plurality of image files created by the first image file creation device based on a plurality of image data acquired by the image device as a set of image data and recorded in the recording medium, with each other as a set of individual image files when the camera is set to a first photography mode in which data of a plurality of image files are combined to create one integrated image file;

a second image file creation device that combines a plurality of the individual image files recorded to the recording medium based on the association information in response to an instruction by a user to create one integrated image file; and a second recording control device that records the integrated image file created by the second image file creation device in a recording medium;

wherein:

when photography modes of the camera include the first photography mode and a second photography mode in which the integrated image file is not created, a file name of the integrated image file recorded in the recording medium in the first photography mode and a file name of the image file recorded in the recording medium in the second photography mode (referred to as a single image file) contain respective number sections expressed as number symbols; and the first recording control device and the second recording control device assign the file names of the integral image file and the single image file so that the number section of the file name of the integral image file and the number section of the file name of the single image file constitute consecutive numbers.

8. A camera, comprising:

an image device that captures an image of a subject to acquire image data;

a first image file creation device that creates an image file based on the image data acquired by the image device;

a first recording control device that records the image file created by the image file creation device in a recording medium;

an information creation device that creates association information for associating a plurality of image files created by the first image file creation device based on a plurality of image data acquired by the image device as a set of image data and recorded in the recording medium, with each other as a set of individual image files when the camera is set to a first photography mode in which data of a plurality of image files are combined to create one integrated image file;

a second image file creation device that combines a plurality of the individual image files recorded to the recording medium based on the association information in response to an instruction by a user to create one integrated image file; and a second recording control device that records the integrated image file created by the second image file creation device in a recording medium;

wherein:

when photography modes of the camera include the first photography mode and a second photography mode in which the integrated image file is not created, the first recording control device assigns respective file names to the individual image files recorded in the recording medium in the first photography mode and the image file (referred to as a single image file) recorded in the recording medium in the second photography mode so that the file names of the individual image file and the single image file do not overlap each other.

9. A camera, comprising:

an image pick-up device that images a subject and acquires image data; and a control device that, if a mode that acquires candidate image data that is stored in one integrated image file is set, records to a recording medium, as a candidate image file, an individual image file created based on the image data acquired by the image pick-up device, wherein:

a file format of the integrated image file is a file format that is configured to store the respective image data of a plurality of the individual image files in a single image file;

the control device records to the recording medium one integrated image file that stores the candidate image data of the candidate image file that has been selected from among the plurality of candidate image files recorded to the recording medium; and when a mode that acquires the candidate image data stored in one integrated image file is set, the control device records to the recording medium, as a candidate image file, the individual image file created based on the image data acquired by the image pick-up device, and the integrated image file that does not store the candidate image data of the candidate image file recorded to the recording medium is created in the recording medium.

10. The camera as set forth in claim 9, wherein:

the control device eliminates from the recording medium the candidate image file corresponding to the candidate image data stored in the one integrated image file after the one integrated image file is created.

11. The camera as set forth in claim 9, wherein:

the control device does not eliminate from the recording medium the candidate image file corresponding to the candidate image data stored in the one integrated image file after the one integrated image file is created.

12. The camera as set forth in claim 9, wherein:

the control device generates one integrated image file that stores the candidate image data of the candidate image file that has been selected by the user, from among a plurality of candidate image files recorded to the recording medium, and records it to the recording medium.

13. The camera as set forth in claim 9, wherein:

the control device stores, in the integrated image file that does not store the candidate image data, the candidate image data of the candidate image file selected from among the plurality of candidate image files recorded to the recording medium so as to record the one integrated image file to the recording medium.

* * * * *